United States Patent
Smadi et al.

(10) Patent No.: US 9,344,485 B2
(45) Date of Patent: May 17, 2016

(54) SHORT RANGE WIRELESS PEER-TO-PEER FILE SHARING

(71) Applicant: BlackBerry Limited, Waterloo (CA)

(72) Inventors: Mohammed Nawaf Smadi, Ancaster (CA); Aleksandar Papo, Waterloo (CA); Ahmed Abdelsamie, Nepean (CA)

(73) Assignee: BlackBerry Limited, Waterloo (CA)

( * ) Notice: Subject to any disclaimer, the term of this patent is extended or adjusted under 35 U.S.C. 154(b) by 283 days.

(21) Appl. No.: 13/893,300

(22) Filed: May 13, 2013

(65) Prior Publication Data

US 2014/0335787 A1 Nov. 13, 2014

(51) Int. Cl.
*H04L 29/08* (2006.01)
*H04W 4/00* (2009.01)

(52) U.S. Cl.
CPC .............. *H04L 67/06* (2013.01); *H04W 4/008* (2013.01)

(58) Field of Classification Search
CPC .............................. H04L 67/06; H04L 67/104
See application file for complete search history.

(56) References Cited

U.S. PATENT DOCUMENTS

| | | | | |
|---|---|---|---|---|
| 2003/0066076 A1* | 4/2003 | Minahan | ......................... | 725/29 |
| 2003/0191753 A1* | 10/2003 | Hoch | ................ | 707/3 |
| 2003/0233455 A1* | 12/2003 | Leber et al. | ................... | 709/226 |
| 2004/0032400 A1* | 2/2004 | Freeman et al. | ............... | 345/173 |
| 2004/0181575 A1* | 9/2004 | Mallberg et al. | ............... | 709/203 |
| 2005/0021915 A1* | 1/2005 | Lowe et al. | ..................... | 711/154 |
| 2006/0008256 A1* | 1/2006 | Khedouri et al. | ............. | 386/124 |
| 2006/0034177 A1* | 2/2006 | Schrempp | ...................... | 370/236 |
| 2006/0187228 A1* | 8/2006 | Jung et al. | ...................... | 345/537 |
| 2011/0010421 A1* | 1/2011 | Chavez et al. | ................ | 709/204 |
| 2013/0225080 A1* | 8/2013 | Doss et al. | .................... | 455/41.2 |
| 2013/0225081 A1* | 8/2013 | Doss et al. | .................... | 455/41.2 |
| 2014/0127994 A1* | 5/2014 | Nightingale et al. | ......... | 455/41.1 |

* cited by examiner

*Primary Examiner* — Bobbak Safaipour
*Assistant Examiner* — Devan Sandiford
(74) *Attorney, Agent, or Firm* — Jenna L. Wilson; Dimock Stratton LLP (firm)

(57) ABSTRACT

In one embodiment, for example, a method of short range wireless peer-to-peer file sharing is provided. The method includes establishing a short range wireless communications link between a local computing device and a peer computing device and transmitting to the peer computing device over the short range wireless communications link a consolidated catalog of accessible files stored locally in the local computing device, remotely in a remote computing device, or both. The method further includes receiving from over the short range wireless communications link a request by the peer computing device to retrieve a selected one of the files. The method includes responding to a determination that the selected one of the files is stored remotely in the remote computing device by facilitating the retrieval by the peer computing device of the selected one of the files from the remote computing device for delivery to the peer computing device.

9 Claims, 2 Drawing Sheets

SHORT RANGE WIRELESS PEER-TO-PEER FILE SHARING

FIELD

The present disclosure relates to file sharing and more particularly to peer-to-peer file sharing amongst proximately positioned computing devices.

BACKGROUND

File sharing refers to the sharing of files between computing devices. Files include computer readable data stored within a file system and include textual documents, binary files, imagery, audio files and video files, an electronically transferable attribute, and any other data content. Originally, sharing could be achieved through the placement of files in removable storage to be accessed by a peer through a file reader. The advent of the global Internet, however, rendered the physical sharing of removable storage impractical for geographically remote peers. Consequently, remote peers historically have shared files through electronic exchanges of data, for example through message attachments, or by way of the file transfer protocol (FTP). These rudimentary methods for sharing files, however, require that the peers enjoy a priori knowledge of files stored by other peers and available for sharing.

BRIEF DESCRIPTION OF THE DRAWINGS

The accompanying drawings, which are incorporated in and constitute part of this disclosure, illustrate example embodiments of the present disclosure and together with the description serve to explain the principles of the present disclosure. It being understood, however, that the teachings herein are not limited to the example embodiments shown herein, wherein.

DETAILED DESCRIPTION

Figure 1:
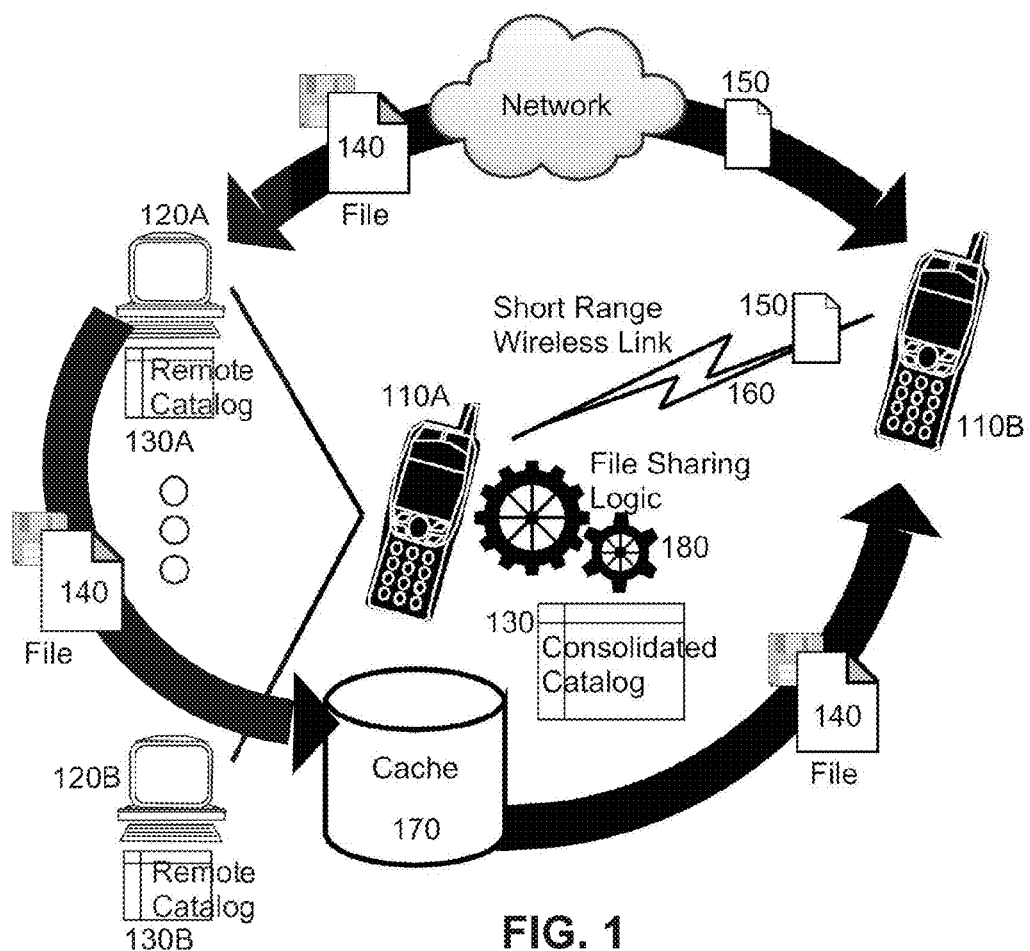
FIG. 1 is a pictorial illustration of a process for short range wireless peer-to-peer file sharing.

Example embodiments herein provide for short range wireless peer-to-peer file sharing. In an embodiment of the invention, different files can be stored locally in a local computing device equipped to support short range wireless communications, and also remotely in one or more remote computing devices accessible by way of a computer communications network such as the global Internet. A catalog consolidating a listing of the different files irrespective of location can be included in the local computing device and transmitted by way of a short range wireless communications link to a peer computing device. Thereafter, the local computing device can receive from a peer computing device a request for file sharing in the consolidated catalog from over the short range wireless communications link.

In response to the peer computing device selecting a file stored within one of the remote computing devices, the local computing device can facilitate the retrieval of the file from a remote one of the computing devices for delivery to the peer computing device over the short range wireless communications link. Specifically, the local computing device can provide an authentication credential for the remote computing device authorizing the peer computing device to directly retrieve the selected file from the remote computing device without further participation by the local computing device. Alternatively, in response to a selection of a remotely disposed file by a wirelessly linked peer computing device, the local computing device can disconnect from the peer computing device, retrieve the selected file when in proximity to the remote computing device, wirelessly reconnect with the peer computing device, and deliver the retrieved selected file to the peer computing device.

In one exemplary embodiment, a method of short range wireless peer-to-peer file sharing is provided. The method includes establishing a short range wireless communications link between a local computing device and a peer computing device and transmitting to the peer computing device over the short range wireless communications link a consolidated catalog of accessible files stored locally in the local computing device, remotely in a remote computing device, or both. The method further includes receiving from over the short range wireless communications link a request by the peer computing device to retrieve a selected one of the files. The method includes responding to a determination that the selected one of the files is stored remotely in the remote computing device by facilitating the retrieval by the peer computing device of the selected one of the files from the remote computing device for delivery to the peer computing device.

In another embodiment, a local computing device is configured for short range wireless peer to peer file sharing. The device includes a processor, a memory in communication with the processor and a file sharing application in the memory. The file sharing application is configured to be executed by the processor to enable the local computing device to transmit to a peer computing device over a short range wireless communications link a consolidated catalog of accessible files stored locally in the local computing device and remotely in a remote computing device. The file sharing application further is configured to receive from over the short range wireless communications link a request by the peer computing device to retrieve a selected one of the files. The file sharing application is configured to respond to a determination that the selected one of the files is stored remotely in the remote computing device by facilitating the retrieval by the peer computing device of the selected one of the files from the remote computing device for delivery to the peer computing device.

In even yet another embodiment, a computer program product for short range wireless peer-to-peer file sharing is provided. The computer program product a computer readable storage medium having computer readable program code embodied therewith. The computer readable program code includes computer readable program code for establishing a short range wireless communications link between a local computing device and a peer computing device and for transmitting, by the local computing device, to the peer computing device over the short range wireless communications link a consolidated catalog of accessible files stored locally in the local computing device and remotely in a remote computing device. The computer readable program code includes computer readable program code for receiving, by the local computing device, from over the short range wireless communications link a request by the peer computing device to retrieve a selected one of the files and for responding, by the local computing device, to a determination that the selected one of the files is stored remotely in the remote computing device by facilitating the retrieval by the peer computing device of the selected one of the files from the remote computing device for delivery to the peer computing device.

Additional aspects will be set forth in part in the description which follows. It is to be understood that both the foregoing general description and the following detailed description are exemplary and explanatory and are not restrictive.

In this regard, FIG. 1 pictorially illustrates a process for short range wireless peer-to-peer file sharing. As shown in FIG. 1, a local computing device 110A such as a phone, smart phone, personal digital assistant, tablet computer and/or personal computer or other electronic device can generate a consolidated catalog 130 of shared files 140 stored locally in the local computing device 110A and/or in one or more remote computing devices 120A, 120B, each providing an individual catalog 130A, 130B of those of the shared files 140 stored therein. Thereafter, a peer computing device 110B can establish with the local computing device 110A, a short range wireless communications link 160, for example a wireless communications link of ten (10) meters or less, or any other short range wireless distance. Examples include a near field communication (NFC) link, BLUETOOTH® low energy ("BTLE") link or a neighborhood awareness networking ("NAN") specified link. (BLUETOOTH is a registered trademark of Bluetooth SIG, Inc.) Also, a Wi-Fi communications link can be used.

The peer computing device 110B can select one of the files 140 listed in the consolidated catalog 130 and disposed remotely in one of the remote computing devices 120A, 120B. In response to the selection of the one of the files 140 by the peer computing device 110B, file sharing logic 180 of the local computing device 110A can generate and transmit to the peer computing device 110B over the short range wireless communications link 160, temporary authentication credentials 150 to permit access by the peer computing device 110B to the one of the remote computing devices 120A, 120B determined to store the selected one of the files 140. Utilizing the temporary authentication credentials 150, the peer computing device 110B can directly retrieve the selected one of the files 140 from the one of the remote computing devices 120A, 120B determined to store the selected one of the files 140.

Alternatively, the file sharing logic 180 can record the selection of the one of the files 140 in the local computing device 110A by the peer computing device 110B. Consequently, subsequent to the disconnection of the short range wireless communications link 160, and upon obtaining access to the one of the remote computing devices 120A, 120B, the file sharing logic 180 can direct the retrieval of the selected one of the files 140 into a cache 170 of the local computing device 110A. Thereafter, when the short range wireless communications link 160 is re-established with the peer computing device 110B, the file sharing logic 180 can deliver the selected one of the files 140 to the peer computing device 110B over the short range wireless communications link 160.

In either circumstance, end users who permit the use of the file sharing logic 180 to share files with peers can be rewarded based upon a degree to which the end users share files. In this regard, the file sharing logic 180 can track how many files have been successfully delivered to peers. Alternatively, the file sharing logic 180 can measure a quantity of data traffic delivered to peers. As yet another alternative, the file sharing logic 180 can measure an amount of bandwidth consumed in delivering files to peers, or an amount of battery power utilized in delivering files to peers. The reward can be monetary, or can include the discounted or free providing of goods or services to the end user to be rewarded.

Figure 2:
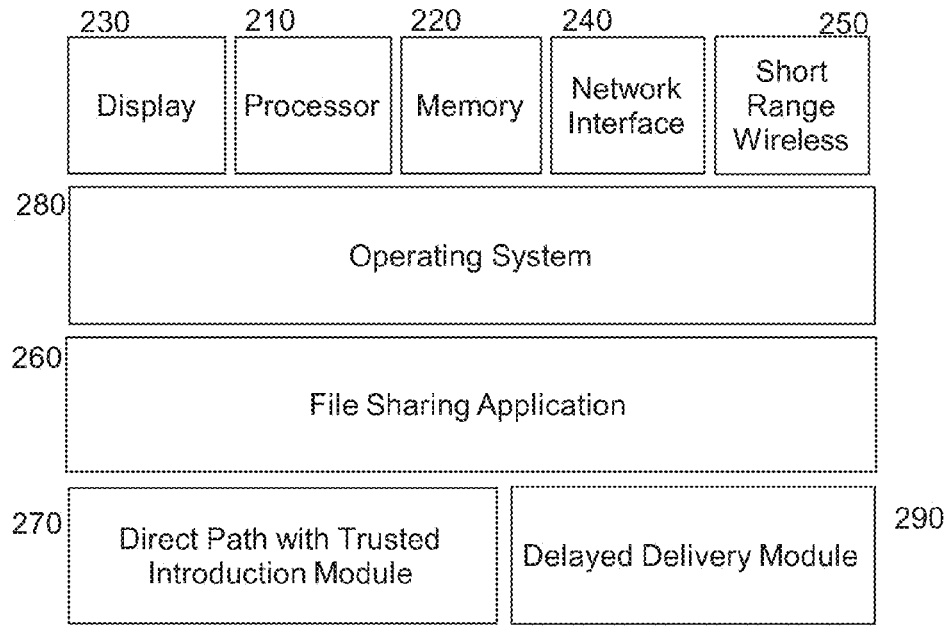
FIG. 2 is a block diagram of a device architecture configured for short range wireless peer-to-peer file sharing.

The local computing device 110A can vary in type and can be, by way of example, a phone, smart phone, personal digital assistant, a personal computer, a mobile device and/or any other electronic device. The local computing device 110A can include a base architecture configured for short range wireless peer-to-peer media sharing. In this regard, in even yet further illustration FIG. 2 is a block diagram of a local computing device architecture configured for short range wireless peer-to-peer file sharing. As shown in FIG. 2, the architecture can include at its base at least one processor 210 coupled to memory 220, e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs.

The processor can execute instructions associated with data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

The architecture also can include a short range wireless transceiver 250 and a network interface 240, and a display 230. The short range wireless transceiver 250 can include circuitry sufficient to transmit and receive short range wireless communications. The network interface 240 in turn can include circuitry sufficient to transmit and receive data communications over a data communications network. Finally, the display can include circuitry and visual display hardware sufficient to visually present data and can include by way of example, any video display terminal including a cathode ray tube based display, a liquid crystal display, a "touch screen" and the like.

Of note, an operating system 280 can moderate access to the processor 210, memory 220, display 230, network interface 240 and short range wireless transceiver 250, and can support the operation of one or more applications including a file sharing application 260.

The file sharing application 260 can be configured to transmit over a short range wireless communications link provided by the short range wireless transceiver 250, a consolidated catalog of shareable files disposed not only in the memory 220 of the local computing device, but also in the memory of other remote computing devices to which the local computing device can become communicatively coupled by way of the network interface 240. The consolidated catalog can be assembled manually by an end user, or in an automated fashion by requesting and retrieving a directory of files of a particular type in each of the remote computing devices. The file sharing application 260 further can be configured to receive over the short range wireless communications link a selection by a communicatively coupled peer computing device of one or more files listed in the consolidated catalog.

In response thereto, the file sharing application 260 can be configured to facilitate the retrieval of the selected file(s) irrespective of whether or not the file is stored locally in the memory 220 of the local computing device or remotely in the memory of other remote computing devices.

In this regard, the file sharing application 260 can be coupled to a direct path with trusted introduction module 270. The trusted introduction module 270 can include program code that when executed in the memory 220 by the processor 210 is enabled to generate for the peer computing device temporary authentication credentials with which the peer computing device can directly retrieve the selected file from the memory of a remote computing device in which the selected file is stored. Thereafter, the peer computing device can be directed over the short range wireless communications link by the module 270 to access the remote computing device with the temporary authentication credentials. By way of example, the credentials can include a temporary identifier and password established at the remote computing device. Alternatively, the credentials can include an authentication token, for example a data object encapsulating authentication credentials, to be submitted to the remote computing device by the peer computing device. In either circumstance, the temporary nature of the credentials can be enforced through an expiration date or time, or as a function of geographic proximity between the local computing device and the peer computing device, such as a maximum distance between the local computing device and the peer computing device permitted to allow the local computing device and peer computing device to communicate via the short range wireless communications link.

Figure 3:
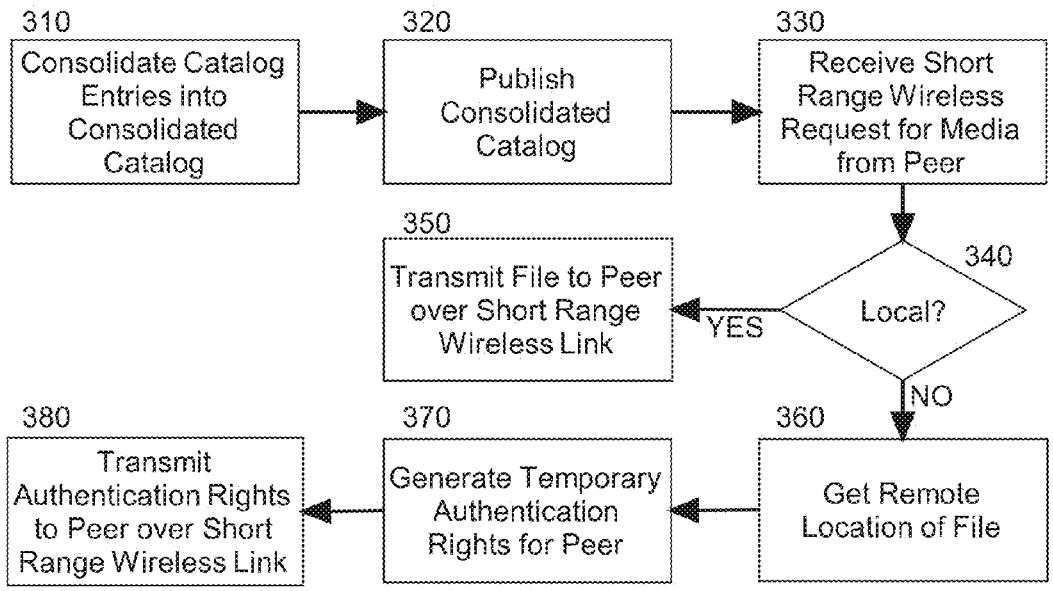
FIG. 3 is a flow chart illustrating a process for short range wireless peer-to-peer file sharing utilizing endorsed access to a remote file data store; and, FIG. 4 is a flow chart illustrating a process for short range wireless peer-to-peer file sharing with delayed delivery of shareable files.

In even yet further illustration of the operation of the direct path with trusted introduction module 270, FIG. 3 is a flow chart illustrating a process for short range wireless peer-to-peer file sharing utilizing endorsed access to a remote file data store. More, less, and/or different steps may be provided in the order shown or a different order. Beginning in block 310, the catalog entries of remotely stored files accessible by the local computing device can be consolidated into a consolidated catalog. In block 320, the consolidated catalog can be transmitted to proximate peer computing devices and in block 330, a request for a particular one of the files in the consolidated catalog can be received over the short range wireless communications link by a peer computing device.

In decision block 340, it can be determined whether or not the selected file is stored locally in the local computing device, or remotely in one of the remote computing devices. If it is determined that the selected file is stored locally in the local computing device, in block 350 the selected file can be retrieved from local storage and transmitted to the peer computing device over the short range wireless communications link. Otherwise, in block 360, the remote computing device in which the selected file is stored can be identified and a temporary authentication can be generated on behalf of the peer computing device for the identified remote computing device by the local computing device. For example, the temporary authentication can be created by the local computing device at the remote computing device in the form of a temporary user identification and password for use by the peer computing device in accessing the selected file stored in the remote computing device. Or, the temporary authentication can be created in the local computing device by the local computing device in the form of a token and the token can be provided to the peer computing device for submission by the peer computing device to the remote computing device to access the selected file stored in the remote computing device.

Finally, in block 380 the temporary authentication can be provided to the peer computing device over the short range wireless communications link. The peer computing device, in turn, can utilize the temporary authentication to directly access the remote computing device to retrieve the selected file. In this regard, the peer computing device can establish a communicative connection to the remote computing device over a data communications network such as the global Internet, provide the temporary authentication to the remote computing device over the communicative connection, and download the selected file from the remote computing device over the communicative connection.

Returning now to FIG. 2, a delayed delivery module 290 also can be coupled to the file sharing application 260. The module 260 can include program code enabled upon execution in the memory 220 by the processor 210 to record a request by the peer computing device received over a short range wireless communications link to retrieve the selected file from memory of a remote computing device for subsequent delivery to the peer computing device. The program code additionally can be enabled to respond to a communicative connection with the remote computing device by retrieving the selected file into a cache defined in the memory 220. Finally, the program code yet further can be enabled to respond to the establishment of a short range wireless communications link with the peer computing device by delivering from the cache to the peer computing device, the selected file.

In some embodiments, the program code of the delayed delivery module 290 can be enabled to record the request by the peer computing device to retrieve the selected file when the peer computing device satisfies one or more eligibility criteria. If the criteria is not satisfied, then the request may not be recorded. For instance, the request may be recorded if the peer computing device is associated with a contact stored in a contact list of the local computing device. The eligibility criteria also can provide that the request is recorded if manually and expressly noted in the local computing device. The eligibility criteria yet further can provide that the request is recorded if the peer computing device has experienced frequent (for example, beyond a threshold value) short range wireless communications links with the local computing device. Any combinations of criteria may be used.

Figure 4:
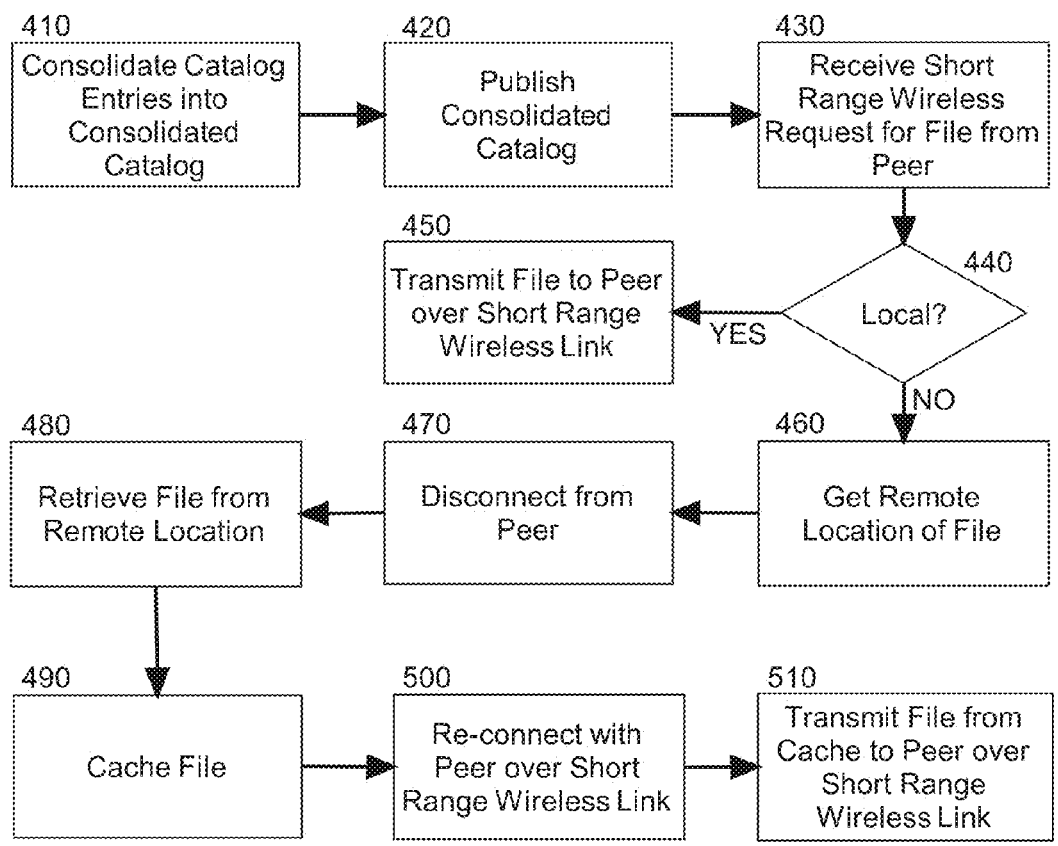

In even yet further illustration of the delayed delivery module 290, FIG. 4 is a flow chart illustrating a process for short range wireless peer-to-peer file sharing with delayed delivery of one or more shareable files. More, less, and/or different steps may be provided in the order shown or a different order. Beginning in block 410, the catalog entries of remotely stored files accessible by the local computing device can be consolidated into a consolidated catalog, for example a list. In block 420, the consolidated catalog can be transmitted to proximate peer computing devices for viewing in the proximate peer computing devices, and in block 430, a request for a particular one or more of the files in the consolidated catalog can be received over the short range wireless communications link by one of the proximate peer computing devices.

In decision block 440, it can be determined whether or not the selected file(s) is stored locally in the local computing device, or remotely in one of the remote computing devices. If it is determined that the selected file is stored locally in the local computing device, in block 450 the selected file can be retrieved from local storage and transmitted to the peer computing device over the short range wireless communications link. Otherwise, in block 460, the remote computing device in which the selected file is stored can be identified and in block

470, the short range wireless communications link with the peer computing device can be terminated.

In block 480, the selected file stored in the remote computing device can be retrieved into the local computing device. For example, the selected file can be transferred to the local computing device by way of removable media, through short range wireless communications, or by way of network communications. In the latter instance, upon establishing a network communications link with the identified remote computing device, the selected file stored in the remote computing device can be retrieved by the local computing device from over the network communications link. In any event, in block 490, the retrieved selected file can be stored in memory of the local computing device and in block 500, as the peer computing device becomes physically proximate to the local computing device, the short range wireless communications link can be re-established. Finally, in block 510, the cached form of the selected file can be transmitted to the peer computing device over the short range wireless communications link.

As will be appreciated by one skilled in the art, aspects of the present disclosure may be embodied as a system, method and/or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described above with reference to flowchart illustrations and/or block diagrams of methods, apparatus (systems) and computer program products according to embodiments. In this regard, the flowchart and block diagrams in the Figures illustrate the architecture, functionality, and operation of possible implementations of systems, methods and computer program products according to various embodiments. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments and is not intended to be limiting.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the form disclosed. Modifications and variations will be apparent to those of ordinary skill in the art without departing from the scope and spirit of the invention. The embodiments were chosen and described in order to explain the principles and the practical application, and to enable others of ordinary skill in the art to understand.

Having thus described the disclosure of the present application in detail and by reference to embodiments thereof, it will be apparent that modifications and variations are possible without departing from the scope of the invention defined in the appended claims as follows:

We claim:

1. A method of short range wireless peer-to-peer file sharing comprising:
    establishing a short range wireless communications link between a local computing device and a peer computing device;
    transmitting to the peer computing device over the short range wireless communications link a consolidated catalog of accessible files stored locally in the local computing device and remotely in a remote computing device;
    receiving from over the short range wireless communications link a request by the peer computing device to retrieve a selected one of the files; and
    responsive to a determination that the selected one of the files is stored remotely in the remote computing device, facilitating the retrieval by the peer computing device of the selected one of the files from the remote computing device for delivery to the peer computing device,
    wherein the local computing device facilitates the retrieval of the selected one of the media files from the remote computing device for delivery to the peer computing device by:
        disconnecting the short range wireless communications link;
        recording a reference to the request in the local computing device;
        establishing a communicative connection to the remote computing device;
        retrieving the selected one of the files from the remote computing device;
        re-establishing the short range wireless communications link with the peer computing device; and
        transmitting the retrieved selected one of the files to the peer computing device over the re-established short range wireless communications link.

2. The method of claim 1, wherein the reference is recorded if a peer associated with the peer computing device is present in a contact list of the local computing device.

3. The method of claim 1, wherein the reference is recorded if the peer computing device is determined to frequently communicate with the local computing device.

4. A local computing device configured for short range wireless peer to peer file sharing, the device comprising:
    a processor;
    a memory in communication with the processor;
    a file sharing application in the memory configured to be executed by the processor to enable the local computing device to:
    transmit to a peer computing device over a short range wireless communications link a consolidated catalog of accessible files stored locally in the local computing device and remotely in a remote computing device;
    receive from over the short range wireless communications link a request by the peer computing device to retrieve a selected one of the files, and
    respond to a determination that the selected one of the files is stored remotely in the remote computing device by facilitating the retrieval by the peer computing device of the selected one of the files from the remote computing device for delivery to the peer computing device,
    wherein the local computing device facilitates the retrieval of the selected one of the files from the remote computing device for delivery to the peer computing device by:
        disconnecting the short range wireless communications link;
        recording a reference to the request in the local computing device;
        establishing a communicative connection to the remote computing device;
        retrieving the selected one of the files from the remote computing device;
        re-establishing the short range wireless communications link with the peer computing device; and
        transmitting the retrieved selected one of the files to the peer computing device over the re-established short range wireless communications link.

5. The local computing device of claim 4, wherein the reference is recorded if a peer associated with the peer computing device is present in a contact list of the local computing device.

6. The local computing device of claim 4, wherein the reference is recorded if the peer computing device is determined to frequently communicate with the local computing device.

7. A computer program product for short range wireless peer-to-peer file sharing, the computer program product comprising:
    a non-transitory computer readable storage medium having computer readable program code embodied therewith, the computer readable program code comprising:
        computer readable program code for establishing a short range wireless communications link between a local computing device and a peer computing device;
        computer readable program code for transmitting, by the local computing device, to the peer computing device over the short range wireless communications link a consolidated catalog of accessible files stored locally in the local computing device and remotely in a remote computing device;
        computer readable program code for receiving, by the local computing device, from over the short range wireless communications link a request by the peer computing device to retrieve a selected one of the files; and computer readable program code for responding, by the local computing device, to a determination that the selected one of the files is stored remotely in the remote computing device by facilitating the retrieval by the peer computing device of the selected one of the files from the remote computing device for delivery to the peer computing device, wherein the local computing device facilitates the retrieval of the selected one of the files from the remote computing device for delivery to the peer computing device by:

disconnecting the short range wireless communications link;

recording a reference to the request in the local computing device;

establishing a communicative connection to the remote computing device;

retrieving the selected one of the files from the remote computing device;

re-establishing the short range wireless communications link with the peer computing device; and transmitting the retrieved selected one of the files to the peer computing device over the re-established short range wireless communications link.

8. The computer program product of claim 7, wherein the reference is recorded if a peer associated with the peer computing device is present in a contact list of the local computing device.

9. The computer program product of claim 7, wherein the reference is recorded if the peer computing device is determined to frequently communicate with the local computing device.

* * * * *